(12) United States Patent
Smith et al.

(10) Patent No.: US 8,753,578 B1
(45) Date of Patent: Jun. 17, 2014

(54) APPARATUS FOR THE PRODUCTION OF BORON NITRIDE NANOTUBES

(75) Inventors: Michael W. Smith, Newport News, VA (US); Kevin Jordan, Newport News, VA (US)

(73) Assignees: Jefferson Science Associates, LLC, Newport News, VA (US); The United States of America as represented by the Administrator of NASA, Washington, DC (US)

( * ) Notice: Subject to any disclaimer, the term of this patent is extended or adjusted under 35 U.S.C. 154(b) by 710 days.

(21) Appl. No.: 12/322,591

(22) Filed: Feb. 4, 2009

(51) Int. Cl.
*B01J 19/08* (2006.01)

(52) U.S. Cl.
USPC ...... 422/186; 204/157.41; 423/290; 977/750; 977/752

(58) Field of Classification Search
CPC ............... B01J 19/121; C04B 35/6229; C01B 21/0641; C30B 29/602; C30B 23/00
USPC ...................... 422/186; 204/157.41; 423/290; 977/750, 752
See application file for complete search history.

(56) References Cited

U.S. PATENT DOCUMENTS

| | | | | |
|---|---|---|---|---|
| 5,300,203 | A * | 4/1994 | Smalley | 204/157.41 |
| 6,792,017 | B2 * | 9/2004 | Halpin | 372/35 |
| 6,855,659 | B1 * | 2/2005 | Zhang | 502/185 |
| 8,047,663 | B2 * | 11/2011 | Pang et al. | 359/614 |
| 2004/0265211 | A1 * | 12/2004 | Dillon et al. | 423/447.3 |
| 2005/0129607 | A1 * | 6/2005 | Takehara et al. | 423/445 B |
| 2007/0110660 | A1 * | 5/2007 | Liu et al. | 423/447.3 |
| 2009/0004069 | A1 * | 1/2009 | Kronholm et al. | 422/171 |

OTHER PUBLICATIONS

Lee et al, "Catalytic-free synthhesis of boron nitride single-wall nanotubes with a preferred zig-zag configuration", Physical Review B. vol. 64 12405 (2001).*
Guo et al "Catalytic growth of single-walled nanotubes by laser vaporization", Chemical Physics letters, 243 (1995), p. 49-54.*
Yu et al "Synthesis of boron nitride nanotubes by means of excimer laser ablation at high temmperature", Applied Physics Letters, vol. 72, No. 16, p. 1966-1968 (1998).*
Shin et al "Pulsed lase ablatin of boron nitride", Material Research Society, vol. 397, p. 265-270, 1996.*

* cited by examiner

*Primary Examiner* — Xiuyu Tai

(57) ABSTRACT

An apparatus for the large scale production of boron nitride nanotubes comprising; a pressure chamber containing; a continuously fed boron containing target; a source of thermal energy preferably a focused laser beam; a cooled condenser; a source of pressurized nitrogen gas; and a mechanism for extracting boron nitride nanotubes that are condensed on or in the area of the cooled condenser from the pressure chamber.

9 Claims, 1 Drawing Sheet

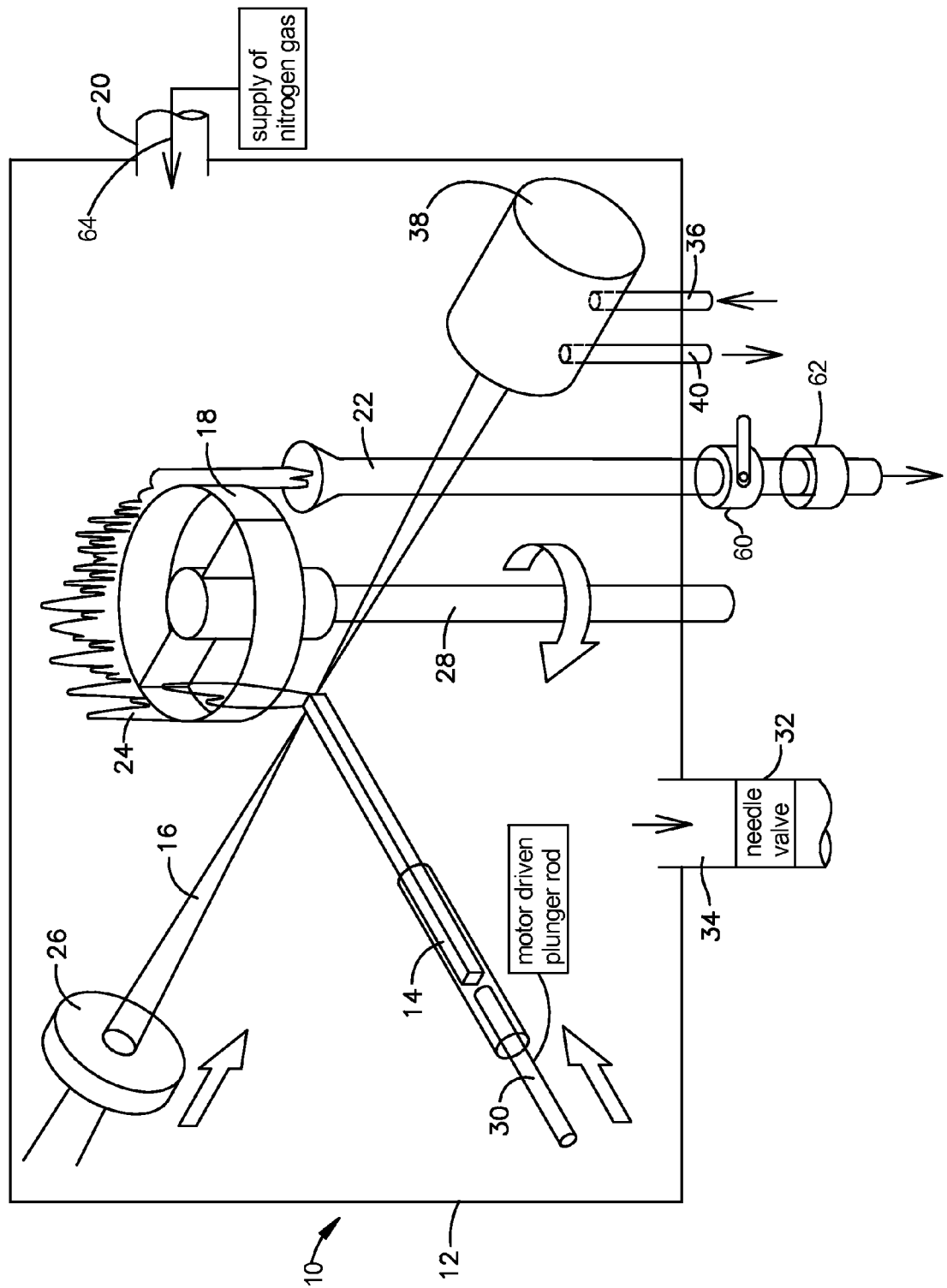

APPARATUS FOR THE PRODUCTION OF BORON NITRIDE NANOTUBES

The United States of America may have certain rights to this invention under Management and Operating Contract DE-AC05-06OR23177 from the United States Department of Energy.

FIELD OF THE INVENTION

The present invention relates to the production of boron nitride nanotubes and more particularly to apparatus for the production of such structures.

BACKGROUND OF THE INVENTION

Since the announcement of the successful synthesis of high-aspect-ratio few-walled boron nitride nanotubes (FW-BNNTs) in 1995, little progress has been made in the scale-up of their synthesis. As a demonstration, in spite of the theoretical capabilities of FW-BNNTs to provide high strength-to-weight, high temperature resistance, piezo-electric actuation, and radiation shielding (via the boron content), the aerospace industry still relies on micron-sized graphite or boron fibers for structural applications. Neither FW-BNNTs nor single-wall carbon nanotubes are widely used in aerospace manufacturing, the industry generally most willing to pay a premium for high performance.

To date, high-aspect ratio FW-BNNTs have been produced in small amounts (from individual tubes to milligrams) by arc-discharge or laser heating methods. A separate class of boron nitride nanotubes has also been produced by chemical vapor deposition of nitrogen compounds (e.g. ammonia) over ball-milled precursors, but these tubes are of larger diameter and do not exhibit the continuous crystalline sp2-type bonding structure which has drawn most theoretical interest.

U.S. patent application Ser. No. 12/152,414 filed May 14, 2008 describes a process for the production of at leas centimeter-long boron nitride nanotubes. The disclosure of this application is hereby incorporated herein by reference in its entirety. In spite of this disclosure of a process for the production of boron nitride nanotubes, no apparatus has yet been described for the practical implementation of the process described in this application.

OBJECT OF THE INVENTION

It is a primary object of the present invention to provide an apparatus for the large scale production of boron nitride nanotubes using the process described in the foregoing U.S. patent application Ser. No. 12/152,414.

SUMMARY OF THE INVENTION

According to the present invention there is provided an apparatus for the large scale production of boron nitride nanotubes comprising: a pressure chamber containing; a continuously fed boron containing target; a source of thermal energy preferably a focused laser beam; a cooled condenser; a source of pressurized nitrogen gas; and a mechanism for extracting boron nitride nanotubes that are condensed on or in the area of the cooled condenser from the pressure chamber.

DESCRIPTION OF THE DRAWINGS

FIG. 1 is a schematic side view of the apparatus of the present invention.

DETAILED DESCRIPTION

Referring now to the accompanying drawing, the apparatus 10 of the present invention comprises: a pressure chamber 12 containing; a continuously fed boron nitride target 14; a source of thermal energy preferably a focused laser beam 16; a rotating cooled condenser ring 18; a supply of nitrogen gas 20; and a collection tube 22 for extracting boron nitride nanotubes from pressure chamber 12 after boron nitride vaporized by the thermal energy source forms a boron nitride plume 24 that condenses on or in the vicinity of rotating cooled condenser ring 18.

As shown in the accompanying Figure, thermal energy source 16 is preferably a laser beam introduced into pressure chamber 12 via a convex lens 26 that allows for focusing of laser beam/thermal energy source 16 within pressure chamber 12. Also as shown in the accompanying Figure, cooled condenser ring 18 is rotated continuously by virtue of its being mounted on a rotating shaft 28 such that a new surface thereof is constantly being brought into the proximity of collection tube 22.

In the preferred embodiment depicted in the accompanying Figure, boron nitride target 14 is a commercially available hot pressed hexagonal boron nitride rod 14 that is continuously fed into the field of laser beam 16 by a motor driven plunger rod 30 or similar device. According to a preferred embodiment, boron nitride target 14 is of square cross-section about 0.050" on a side and is introduced into laser beam 16 not a the focal waist of laser beam 16 but rather at a position where laser beam 16 is of approximately the same size boron nitride target rod 14. According to this preferred embodiment, target rod 14 is advanced at a rate of about 1 mm/sec into the beam 16 of a 2 kW $CO_2$ laser having a wavelength of about 10.6 microns and a diameter of about 12 mm.

A small flow of nitrogen gas of about 40 SCFH is maintained into pressure chamber 12 via supply of nitrogen gas 20 whose flow is regulated, for example, by a needle valve 32 in the chamber exhaust 34.

According to the preferred embodiment depicted in the accompanying Figure, laser beam 16 terminates in a copper block 38 cooled by water provided thereto by inlet and outlet 38 and 40. Copper block 38 is designed to absorb the full, continuous power of laser beam 16 without damage.

Similarly, rotating condenser 18 is water cooled by conventional means well within the skills of the skilled artisan to maintain it a temperature of about 20° C. According to the preferred embodiment depicted in the accompanying Figure, rotating condenser 18 is a hoop of about 0.025" copper attached to a water cooled rotating copper shaft 28.

In operation, as target rod 14 is converted continuously from solid to gas by the action of laser beam 16, a buoyant plume of vapors 24 rise vertically from the laser interaction zone. Plume 24 is intercepted by condenser ring 18. Where plume 24 is intercepted by condenser ring 18, boron nitride nanotubes form at a high rate. Web-like tufts of boron nitride nanotubes 4 inches in length and more, form in vertical structures which are attached at the lower end to condenser ring 18. These boron nitride nanotube structures form in fractions of a second, as recorded by videographic visualizations. As condenser 18 rotates, fresh boron nitride nanotubes grow on each newly exposed section of the advancing condenser surface.

The boron nitride nanotubes are removed from rotating condenser 18 by means of a collection tube 22 which leads to the outside of pressure chamber 12. When a ball valve 60 in collection tube 22 is opened, the boron nitride nanotubes are "vacuumed" from rotating condenser ring 18 by the nitrogen gas exhausting to 1 atmosphere. Boron nitride nanotubes are collected in a wire mesh filter 62 installed in-line in collection tube 22.

While the foregoing describes a specifically preferred embodiment of the present invention, it will be apparent that other variations of the particular parameters can be utilized. For example: for the preferred embodiment just described, the pressure was held at about 12 atmospheres, but higher pressures are anticipated to produce better results; hot-pressed boron nitride was used as the preferred target, but other targets will be suitable, given acceptable interaction with the laser. For instance, hot pressed boron powder has been produced in the literature and would make a good target, given the appropriate laser properties. Any dense version of boron or boron nitride will work; as long as the laser interacts with the target to produce a continuous stream of vapor the wavelength or other laser properties are not important. Any kW class laser should reproduce these results. Nd:YAG, or free electron lasers are 2 examples; the shape of condenser 18 can take many variations as long as it provides for free flow of the vapor plume it will work and Nb wire, W wire, Nb sheetstock, and Cu sheetstock have all proven useful; both mechanical and suction have been shown as useful to collect boron nitride nanotubes. Since the material tends to stick to itself or to a surface, it could be wrapped around, stuck to, or sucked into any number of geometries and since boron nitride nanotubes also responds well to static charging they can be collected by this mechanism as well. Additionally, although the cooled condenser has been depicted as a cooled ring, it could equally as well comprise a cooled oscillating structure and the mechanism for collecting boron nitride nanotubes could comprise one or more collection tubes in the vicinity of the extremes of oscillation of the cooled oscillating condenser.

There has thus been described an apparatus for the practical large scale production of boron nitride nanotubes which apparatus is useful in the implementation of the methods described in U.S. patent application Ser. No. 12/152,414 filed May 14, 2008 whose disclosure has been incorporated herein in its entirety.

As the invention has been described, it will be apparent to those skilled in the art that the same may be varied in many ways without departing from the spirit and scope thereof. Any and all such modifications are intended to be included within the scope of the appended claims.

What is claimed is:

1. Apparatus for the large scale production of boron nitride nanotubes from a continuously fed boron containing target rod comprising:
   a pressure chamber;
   a supply of nitrogen gas into said pressure chamber; and
   a chamber exhaust;
   said pressure chamber including
   the continuously fed boron containing target rod;
       a rotating cooled condenser ring;
       a laser producing a laser beam;
       a lens for focusing said laser beam on said continuously fed boron containing target rod, said boron containing target rod is introduced into said laser beam at a position away from the focal waist of the laser beam and where said laser beam is about the same size as said boron containing target rod, said boron containing target rod being introduced into said laser beam at a position below said rotating cooled condenser ring;
       a collection tube for removing boron nitride nanotubes from said rotating condenser ring, said collection tube extending to the outside of said pressure chamber; and
       a cooled block that terminates said laser beam by absorbing the full continuous power of said laser beam.

2. The apparatus of claim 1 including a valve in said chamber exhaust for regulating said supply of nitrogen gas into said pressure chamber.

3. The apparatus of claim 1 including a motor-driven plunger rod for continuously feeding said boron containing target rod.

4. The apparatus of claim 1 wherein said cooled block is a copper block.

5. The apparatus of claim 1 wherein said lens is a convex lens.

6. The apparatus of claim 1 including a valve on said collection tube for opening and closing said collection tube.

7. The apparatus of claim 1 including an in-line wire mesh filter installed on said collection tube for collecting boron nitride nanotubes vacuumed from said rotating cooled condenser ring.

8. The apparatus of claim 2 wherein said valve in said chamber exhaust is a needle valve.

9. The apparatus of claim 1 wherein said laser is selected from the group including CO2 laser, Nd:YAG laser, and free electron laser.

* * * * *